United States Patent [19]
Ryntz et al.

[11] Patent Number: 4,766,185
[45] Date of Patent: Aug. 23, 1988

[54] POLYSILOXANE GRAFT COPOLYMERS, FLEXIBLE COATING COMPOSITIONS COMPRISING SAME AND BRANCHED POLYSILOXANE MACROMERS FOR PREPARING SAME - II

[75] Inventors: Rose A. Ryntz, Clinton Township, Macomb County; Kenneth R. Kurple, Anchorville; Panagiotis Kordomenos, Mt. Clemens, all of Mich.

[73] Assignee: E. I. Du Pont de Nemours and Company, Wilmington, Del.

[21] Appl. No.: 41,247

[22] Filed: Apr. 22, 1987

[51] Int. Cl.$^4$ .............................................. C08F 283/00
[52] U.S. Cl. ................................... 525/479; 528/24; 528/26; 528/28
[58] Field of Search ................... 525/479; 528/24, 28, 528/26; 427/387, 388.1; 428/447, 450

[56] References Cited

U.S. PATENT DOCUMENTS

| | | | |
|---|---|---|---|
| 3,012,987 | 12/1961 | Ansul | 260/45.4 |
| 3,763,079 | 10/1973 | Fryd | 260/37 N |
| 3,882,189 | 5/1975 | Hudak | 260/351 |
| 3,954,899 | 5/1976 | Chang et al. | 260/849 |
| 3,962,369 | 6/1976 | Chang et al. | 260/849 |
| 3,962,522 | 6/1976 | Chang et al. | 428/423 |
| 4,017,456 | 4/1977 | Tucker et al. | 260/45.8 R |
| 4,034,017 | 7/1977 | Chang et al. | 260/859 R |
| 4,134,873 | 1/1979 | Diaz et al. | 260/37 N |
| 4,205,115 | 5/1980 | Piccirilli et al. | 428/334 |
| 4,208,495 | 6/1980 | Chang et al. | 525/44 |
| 4,235,977 | 11/1980 | Frisch et al. | 521/166 |
| 4,420,601 | 12/1983 | Kuroda et al. | 528/76 |
| 4,499,151 | 2/1985 | Dowbenko et al. | 428/447 |
| 4,501,868 | 2/1985 | Boubaulis et al. | 526/208 |
| 4,522,976 | 6/1985 | Grace et al. | 524/722 |
| 4,533,703 | 8/1985 | Kordomems et al. | 525/440 |
| 4,673,718 | 6/1987 | Ryntz et al. | 525/479 |

OTHER PUBLICATIONS

Product Bulletin: Silikophen® P 50/300.
Product Bulletin: Silicone Resin Reactive Intermediate SR 191.
Product Bulletin: Wacker-Silicon-Intermediate SY 231.

Primary Examiner—Melvyn I. Marquis

[57] ABSTRACT

Hydroxy functional polysiloxane graft copolymers are provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer has a number average molecular weight between about 1,300 and about 15,000, has a hydroxyl number between about 30 and about 300, and is the reaction product of carbon-carbon double bond-reactive monoethylenically unsaturated monomer with hydroxy functional carbon-carbon double bond-bearing branched polysiloxane macromonomer. The macromonomer is the reaction product of (i) isocyanato monomer having the formula:

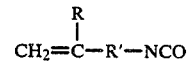

with (ii) hydroxy functional polysiloxane reactant containing 0-10 urethane linkages per molecule.

26 Claims, No Drawings

POLYSILOXANE GRAFT COPOLYMERS, FLEXIBLE COATING COMPOSITIONS COMPRISING SAME AND BRANCHED POLYSILOXANE MACROMERS FOR PREPARING SAME - II

TECHNICAL FIELD

This invention relates to resins and flexible coating compositions comprising same which have excellent adherence to metal and plastic and possess superior weathering properties. More particularly, the invention relates to hydroxy functional polysiloxane graft copolymers and to coating compositions comprising same.

BACKGROUND

Recently, there has been interest in the use of resilient coating materials for areas which are subject to mechanical shock, such as automobile bumpers, moldings and front ends. To maintain the desired appearance for a protective coating on a motor vehicle body panel or like application, any such coating must have certain properties, such as a high degree of extensibility, impact resistance, and resistance to cracking and degradation under severe environmental conditions such as low temperature and high humidity. Conventional coatings, including those heretofore employed on rubber and similar extensible objects, do not have the required combination of properties. Generally, compositions that are flexible enough to be applied over both metal and plastic substrates have rather poor weatherability, appearance, and/or overall durability.

U.S. Pat. No. 3,882,189 and U.S. Pat. No. 3,962,522 are exemplary of numerous patents which describe flexible coating compositions, wherein the resin comprises polyurethane modified polyesters formed by reacting polyisocyanate with polyester polyols. These resins are cured with amine-aldehyde crosslinkers. It is taught therein, that the presence of the urethane groups in the polymer significantly contributes to the flexibility as well as improved weathering properties, gloss, and abrasion resistance of the coating. Such coatings, however, are not of an overall quality to meet certain applications, particularly automotive applications. Accordingly, it is an object of the present invention to provide novel polysiloxane graft copolymers and solvent based, thermosetting coating compositions comprising same, suitable to produce flexible cured coatings with good adhesion over diverse substrates including both metal and plastic substrates. In this regard, it is a particular object of the invention to provide such flexible coating compositions at sufficiently low Volatile Organic Content (VOC) to aid in meeting governmental emissions guidelines and yet which can be applied to a substrate by spraying or other known methods. It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, a novel, non-gelled, hydroxy functional polysiloxane graft copolymer is provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer of the invention has a number average molecular weight between about 1300 and about 15,000, has a hydroxyl number between about 30 and about 300, and is the reaction product of carbon-carbon double bond-reactive monoethylenically unsaturated monomer with hydroxy functional carbon-carbon double bond-bearing branched polysiloxane macromonomer. This reaction is performed under free radical polymerization reaction conditions and the monomer bears substantially no functionality which would be substantially reactive with the hydroxy functionality of the macromonomer under such reaction conditions. The macromonomer is the reaction product of (i) isocyanato monomer having the formula:

where R preferably is H or alkyl of 1 to about 7 carbons and R' is a divalent hydrocarbon linking moiety which does not substantially interfere with the reactivity of either the isocyanate group or the ethylenic double bond of the isocyanato acrylate, with (ii) hydroxy functional polysiloxane reactant containing 0-10 urethane linkages per molecule. Preferably, the divalent linking moiety, R', is alkylene of from 1 to about 7 carbons, $COO(CH_2)_n$, n being 1 to about 7, $CH(CH_3)C_6H_4C(CH_3)_2$, or $COO(CH_2)_mOCONHC_6H_x$—$Q_y$, m being from 1 to about 7, x and y together equaling 6 and each Q being any substituent group which does not substantially interfere with the reactivity of either the isocyanate group or the ethylenic double bond of the isocyanato monomer.

According to the coating composition aspect of the invention, the aforesaid copolymer is employed with polyfunctional, hydroxy-reactive crosslinking agent selected from aminoplast crosslinking agent, polyisocyanate crosslinking agent, blocked polyisocyanate crosslinking agent comprising at least two isocyanate groups blocked by reaction with active hydrogen bearing blocking agent, and any compatible mixture thereof. The crosslinking agent is included in an amount sufficient to provide, at a cure temperature of the composition, between about 0.5 and about 1.6 hydroxy-reactive groups per hydroxy group contributed by the hydroxy functional polysiloxane graft copolymer.

The coating compositions of the invention can be formulated as either one component coating compositions or two component coating compositions. Typically, unblocked polyisocyanate crosslinking agent is employed in two component compositions in view of its reactivity. A composition of the invention can be formulated, for example, as a one component primer, typically employing blocked polyisocyanate or aminoplast crosslinking agent, as a one component topcoat, preferably employing aminoplast crosslinking agent, or as a two component coating, typically employing polyisocyanate crosslinking agent. Also, the graft copolymer of the invention can be formulated as a pigmented base coat, typically a one component composition, for a base coat/clear coat system such as are known for use as automotive finishes. It also can be formulated as the clear coat thereof, either as a one component or a two component composition.

Advantageously, the flexible coatings of the invention possess superior weathering properties as well as excellent adhesion to metal and plastic, thus making them well suited for use as coatings on, for example, various motor vehicle components. The ability to use the same coating composition on metal and plastic components in motor vehicle production offers distinct commercial advantages, particular in terms of production efficiency. Additionally, because these coatings can be employed on metal as well as plastic components, the problem of color matching, which must be resolved when using different coatings on metal and plastic parts which are to be in proximity to one another, is eliminated. The siloxane moieties incorporated into the graft copolymer advantageously provide enhanced flexability, durability and weatherability and provide lower viscosity for high solids coatings. These and additional features and advantages of the invention will be better understood in view of the following detailed disclosure.

DETAILED DESCRIPTION OF THE INVENTION

The resin of the invention is a novel, hydroxy functional polysiloxane graft copolymer of number average molecular weight ($M_n$) between about 1,300 and about 15,000, preferably between about 1,300 and about 4,000, and having a hydroxyl number between about 30 and about 300, preferably between about 50 and about 150. The resin is optionally urethane-modified, more specifically, containing about 0–10 urethane linkages per molecule. Preferably, the resin contains about 0–5 urethane linkages per molecule. As disclosed above, the resin is the reaction product of carbon-carbon double bond reactive monoethylenically unsaturated monomer with certain hydroxy functional carbon-carbon double bond-bearing branched polysiloxane macromonomer. Each of these reactants is discussed below in greater detail.

Carbon-Carbon Double Bond-Reactive Monoethylenically Unsaturated Monomer

Numerous carbon-carbon double bond-reactive monoethylenically unsaturated monomers suitable for making the graft copolymer are known to the skilled of the art. Included are many which are commercially available and many which will be readily apparent in view of the present disclosure. The choice of monomer reactant employed in making the graft copolymer will depend to a large extent upon the particular application intended for the resin or for the coating composition in which the resin is to be used. Examples of suitable monoethylenically unsaturated monomers include, for example, vinyl aromatic hydrocarbons such as styrene, alpha methyl styrene, and vinyl toluene, vinyl acetate, vinyl chloride, and the like.

Preferred monomers are acrylate monomers. Numerous suitable acrylate monomers are known to the skilled of the art and include many which are commercially available and which will be readily apparent in view of the present disclosure. As noted above, the choice of monomer reactant employed in preparing the resin of the invention will depend to a large extent upon the particular application intended for the resin or for the composition in which the resin is used. Suitable hydroxy-substituted alkyl(meth)acrylates (where "alkyl(meth)acrylates" means, in the alternative, alkylacrylates and alkylmethacrylates) which can be employed comprise members selected from the group consisting of the following esters of acrylic or methacrylic acid and C2–C12 aliphatic glycols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl(meth)acrylates including those listed above could be employed, the preferred hydroxy functional monomers for use in the resin of this invention are hydroxy-substituted alkyl acrylates and methacrylates having a total of 5 to 7 carbon atoms, i.e., esters of C2–C3 dihydric alcohols and acrylic or methacrylic acids, such as hydroxyethyl methacrylate, hydroxyethyl acrylate, hydroxypropyl methacrylate and hydroxypropyl acrylate.

Most preferably, the hydroxy-substituted alkyl(meth)acrylate monomer comprises a compound of the formula:

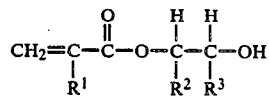

wherein $R^1$ is hydrogen or methyl and $R^2$ and $R^3$ are independently selected from the group consisting of hydrogen and alkyl of from 1 to 6 carbon atoms. Illustrative of these particularly suitable hydroxy-substituted alkyl(meth)acrylate monomers are 2-hydroxyethyl methacrylate, 2-hydroxyethyl acrylate, 2-hydroxypropyl acrylate, 2-hydroxybutyl acrylate and 2-hydroxy-1-methylhexyl acrylate.

Suitable non-hydroxy substituted alkyl(meth)acrylate monomers which may be employed are (meth)acrylates (as before, meaning esters of either acrylic or methacrylic acids) as well as mixtures of acrylates and vinyl hydrocarbons. Preferred non-hydroxy substituted monomers are esters of C1–C12 monohydric alcohols and acrylic or methacrylic acids, e.g., methylmethacrylate, ethylacrylate, butylacrylate, butyl-methacrylate, hexylacrylate, 2-ethylhexylacrylate, lauryl-methacrylate, glycidyl methacrylate, and the like. Particularly preferred non-hydroxy substituted monomers are compounds selected from the group consisting of monomers of the formula:

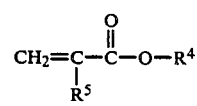

wherein $R^4$ is alkyl of from 1 to 6 carbon atoms and $R^5$ is hydrogen or methyl. Particularly preferred are butyl acrylate, butyl methacrylate and methyl methacrylate.

The aforesaid monovinyl aromatic hydrocarbons, preferably containing from 8 to 12 carbon atoms, including styrene, alpha-methyl styrene, vinyl toluene, t-butyl styrene, chlorostyrene and the like, when employed, will generally be present in an amount of from about 5 to 95 weight percent, preferably from about 5 to 25 weight percent of the total monoethylenically unsaturated monomer.

In addition, other suitable monoethylenically unsaturated monomers such as vinyl chloride, acrylonitrile, methacrylonitrile, vinyl acetate, acrylic acid and methacrylic acid also may be employed. In the case of acrylic acid, when employed, this monomer will generally be present in an amount from about 2 to 5 weight percent of the total monomer mixture. The remaining above-mentioned monomers will generally be used in an amount of from 3 to 10 weight percent of the monomer mixture, when employed.

Hydroxy Functional Carbon-Carbon Double Bond-Bearing Branched Polysiloxane Macromonomer The hydroxy functional polysiloxane macromonomer is reacted with the above described monoethylenically unsaturated monomer according to any of various methods well known to the skilled of the art, which methods will be apparent in view of the present disclosure. Specifically, the macromonomer and the monomer are employed in a weight ratio of from about 75:25 to about 50:50, respectively. Preferably, all double bonds of the macromonomer are reacted with monomer double bonds. It will be apparent that the resulting resin will be hydroxy functional by virtue of the macromonomer hydroxyl groups and the monomer hydroxyl groups (if any). Suitable reaction conditions will be apparent to the skilled of the art and, generally, will include a solvent system and reaction temperature favoring free radical polymerization reaction.

The hydroxy functional polysiloxane macromonomer is the reaction product of any of certain isocyanato monomer reactants with any of certain hydroxy functional polysiloxane reactants. Each of these reactants is discussed below in greater detail.

Isocyanato Monomer

Isocyanato monomer reactants suitable for reaction with hydroxy functional polysiloxane reactants in making the macromonomer of the invention are those according to the formula:

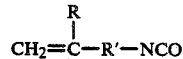

wherein R preferably is hydrogen or alkyl of 1 to about 7 carbons, preferably $CH_3$, and R' is a hydrocarbon linking moiety, preferably alkylene of from 1 to about 7 carbons, $COO(CH_2)_n$, n being 1 to about 7, preferably about 2, $CH(CH_3)$ $C_6H_4C(CH_3)_2$, or $COO(CH_2)_mOCONHC_6H_x$—$Q_y$, m being from 1 to about 7, preferably about 2, x and y together eqauling 6 and each Q being any substituent group which does not substantially interfere with the reactivity of either the isocyanate group or the carbon-carbon double bond of the isocyanato monomer preferably being $CH_3$. Numerous such isocyanato monomers are well known to the skilled of the art, many of which are commercially available or readily prepared according to known methods. The choice of isocyanato monomer employed in preparing the macromonomer will largely depend upon the particular application intended for the final resin or composition comprising the resin. Preferred isocyanato monomers include, for example, isocyanato ethyl methacrylate, which is most preferred, isocyanato propyl methacrylate, 1-(1-isocyanato-1-methylethyl)-3-(1-methylethenyl)benzene, and any compatible mixture thereof. Suitable isocyanato acrylates can be prepared, for example, by reacting a hydroxy functional acrylic monomer, such as hydroxy alkyl acrylate, for example hydroxy propyl acrylate or, preferably, hydroxy ethyl acrylate, with a diisocyanate. Preferred diisocyanates for this reaction are those wherein the two NCO groups of the molecule have different reactivities, such as isophorone diisocyanate and 2,4-toluene diisocyanate. Such reaction is carried out accordng to reaction techniques well known to the skilled of the art.

Hydroxy Functional Polysiloxane Reactant

The hydroxy functional polysiloxane reactant has a number average molecular weight ($M_n$) preferably between about 1,000 and about 12,000, more preferably between about 1,000 and about 3,000, and has a hydroxyl number preferably between about 30 and about 300, more preferably between about 50 and about 150. As discussed further below, this polysiloxane reactant preferably, but not necessarily, is urethane modified, that is, bears urethane linkages in the polysiloxane backbone. Suitable hydroxy functional polysiloxane reactants, both urethane modified and unmodified, will be apparent in view of the present disclosure and can be prepared according to known methods which also will be apparent in view of the present disclosure. The choice of polysiloxane reactant will depend to a large extent upon the particular application intended for the final resin or composition in which such resin is used.

The isocyanato monomer reactant and polysiloxane reactant are reacted together according to known methods and reaction conditions. Typically, these two reactants are employed in molar ratio of from about 2:1 to about 1:2, more preferably about 1:1. More generally, the isocyanato monomer is used in an amount insufficient to yield a gelled reaction product. Also, the isocyanato monomer reactant is used in an amount insufficient to react with all of the hydroxy functionality of the polysiloxane, since the reaction product, the branched polysiloxane macromonomer, must have hydroxy functionality to react with the crosslinking agent during cure. The reaction conditions for preparing the macromonomer should be selected to promote only the reaction between the NCO groups of the isocyanato monomer with the hydroxyl groups of the polysiloxane reactant. A catalyst should be employed for the reaction between the NCO functionality of the isocyanato monomer and the hydroxy functionality of the polysiloxane. Suitable catalysts for this reaction are known and include those described in Part I, Chapter IV of *Polyurethanes*, J. H. Saunders and K. E. Fruch, Wiley-Interscience, New York, 1962. Suitable commercially available catalysts include, for example, activators (which accelerate the heat activation of the reaction) such as the polyurethane catalysts of the conventional type, e.g., tertiary amines, such as triethyl amine, tributyl amine, N-methylmorpholine, N-ethylmorpholine, N,N,N',N'-tetramethylenediamine, 1,4-diazabicyclo[2,2,2]octane, N-methyl-N'-dimethylaminoethylpiperazine, N,N-diethylbenzylamine, N-N-diethylbenzylamine, 2-methylimidazole, and the like. Other suitable catalysts are metal catalysts such as stannous chloride, stannous octoate, di-N-butyltindilaurate, stannous oxide, stannous oxalate, butyltintris(2-ethylhexoate), dibutyltin oxide and the like. Mixtures of the tertiary amines and metal catalysts can be used in a synergistic manner. Additional suitable catalysts will be apparent in view of the present disclosure. It is also preferred to employ an agent to inhibit polymerization reaction of the carbon-carbon double bonds of the isocyanato monomer reactant if the reaction temperature is to exceed 150° F. Suitable inhibiting agents are well known and include, for example, hydroquinone, benzoquinone, nitric oxide and others which will be apparent in view of this disclosure.

One suitable class of polysiloxane reactants comprises the reaction products of first reactant comprising polyol with second reactant comprising certain alkoxy silicone and, optionally, dicarboxylic acid or an anhydride thereof. Where the graft copolymer is to be employed in high solids coating for motor vehicle exterior body panels, for example, such second reactant preferably comprises about 5%-35% by weight alkoxy silicone and the remainder dicarboxylic acid or anhydride; more preferably the second reactant comprises about 5%-15% alkoxy silicone. Obviously, where the second reactant comprises dicarboxylic acid or anhydride, the reaction product of the second reactant with polyol will contain polyester linkages as well as polysiloxane linkages. Herein, such reaction product will be referred to simply as polysiloxane regardless whether it has such polyester linkages. The alkoxy silicone can be reacted with polyol either simultaneously with the dicarboxylic acid or sequentially (in either order) and the alkoxy silicone and diacid also can be reacted with seperate portions of the polyol. Most preferably the polysiloxane is an oligomeric polysiloxane.

Preferably, the diacid is selected from the group consisting of saturated and unsaturated, cyclic and acyclic aliphatic dicarboxylic acids, aromatic dicarboxylic acids, and suitable anhydrides thereof. Preferred dicarboxylic acids are the $C_6$-$C_{36}$ acids, which include, for example, adipic, azelaic, sebasic, dodecane dicarboxylic acid, cyclohexanedicarboxylic acid and dimer acids. More preferably, the dicarboxylic acids employed are aliphatic dicarboxylic acids, most preferably additionally being linear, for example, adipic, azelaic, dimer, and dodecanoic. Also suitable for use are blocked dicarboxylic acids such as dimethyl-1,4-cyclohexanedicarboxylate. Mixtures of suitable diacids and/or their anhydrides may also be used as the dicarboxylic acid component in this invention.

Numerous suitable alkoxy silicones for use in making the hydroxy functional polysiloxane reactant are known to the skilled of the art and will be readily apparent in view of the present disclosure. Included are many commercially available alkoxy silicones and others which can be readily prepared according to known methods. Preferred alkoxy silicones have number average molecular weight between about 350 and about 10,000, more preferably between about 350 and about 1000. Preferred are those of the general formula:

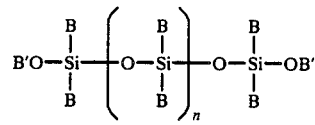

wherein each B is independently selected from hydrogen, alkyl, alkoxy, aryl, aryloxy and the like, each alkyl moiety preferably being $C_1$ to $C_7$ and each arly moiety preferably being $C_6$-$C_8$; each B' is independently selected from alkyl, preferably $C_1$ to $C_7$ alkyl; and n is 1 to about 75, preferably about 1 to about 25. Preferred alkoxy silicones include certain commercially available products such as, for example, alkoxy silicone SR 191 (trademark; General Electric Company, Waterford, N.Y.) which is a 100% silicone resin having siloxane content of 88.9%, methoxy content of 15%, and number average molecular weight of 600. Another suitable alkoxy silicone is SR-193 (trademark; General Electric Company), which is similar to SR-191, but contains certain silicone modifying agents and produces a somewhat more brittle product. Also suitable is Silikophen P50/300 (trademark; available from Goldschmidt Chemical Corp., Hopewell, Va.) a phenyl methyl polysiloxane resin in a xylene/2-methoxypropanol-1 solvent. Also suitable is Wacker Silicone-Intermediate SY-231 (trademark; Wacker-Chemie GmbH, Munich, Germany) which is taught for use in preparing polyesters and coating compositions and has an average molecular weight of 800, methoxy content of 14 weight percent, total silicone content of 89 weight percent (all methoxy groups replaced by Si—O—Si bonds) and $SiO_2$ content of 44 weight percent gravimetric. Mixtures of alkoxy silcones also may be used in reaction with the polyol reactant to prepare the hydroxy functional polysiloxane reactant.

Numerous suitable polyols for making the hydroxy functional polysiloxane reactant are known to the skilled of the art and will be readily apparent in view of the present disclosure. Included are many commercially available polyols and others which are readily prepared according to known methods. Preferably, the polyol comprises diol and triol in hydroxyl equivalent ratio of from about 4:1 to about 1:4, more preferably from about 3:1 to about 3:2.5, respectively. Suitable diols include, but are not limited to, alkylene glycols, such as butylene glycol, neopentyl glycol, 1,5-pentene glycol, 3-cyclohexene-1,1-dimethylol, and other glycols such as hydrogenated bisphenol A, caprolactone diol (e.g., the reaction product of caprolactone and ethylene glycol), hydroxy alkylated bisphenol, polyether glycols, e.g., poly(oxytetramethylene) glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 (trademark; Union Carbide Corp., Danbury, Conn.)

The polyol generally should comprise at least about 5 weight percent triol and may consist substantially entirely of triol. The polyol component also may comprise tetrols and higher functionality polyols, but these generally are less preferred. By employing diols in the polyol component in addition to the triols, the flexibility of the coating composition is generally increased. Thus, selection of the polyol component to be used in forming the polysiloxane will be dependent on the particular desired properties and application of the coating composition. When diols are employed in the polyol component, the polyol preferably comprises from about 10 to about 80 weight percent triols and from about 90 to about 20 weight percent diols. Preferred triols are conventional low molecular triols such as 1,2,6-hexanetriol, 1,1,1-trimethylolpropane, 3-(2-hydroxypropoxy)-1,2-propanediol and polycaprolactone triols, which are commercially available as, for example, Tone-301 (trademark; Union Carbide Corp., Danbury, Conn.). Additional preferred polycaprolactone triols are described in U.S. Pat. No. 4,165,345, incorporated herein by reference. Suitable tetrols will be apparent also and include, for example, pentaerythritol and the like.

While a number of types of polyols have been mentioned above as suitable for use in making the hydroxy functional polysiloxane reactant, their disclosure is not meant to be limiting. A great many additional suitable diols, triols, etc. are known in the art and selection of other polyols which would be suitable for use would be well within the skill of those in the art in view of this disclosure.

The polyol reactant (i.e., diols, triols and optionally tetrols, etc.) and the second reactant (i.e., alkoxy silicone and, optionally, dicarboxylic acid or anhydride thereof) are combined and reacted, generally in the presence of a catalyst and at elevated temperatures, to produce the aforesaid hydroxy functional polysiloxane. Suitable catalysts for the carboxy/hydroxy condensation reaction include such catalysts as tetraisopropyl titanate, strong acids such as p-toluene phosphonic acid, phosphoric acid, sulfuric acid and materials such as zinc oxide, antimony oxide ($Sb_2O_3$), dibutyl tin oxide, hydrated monobutyl tin oxide, and sodium acetate. Other catalysts will be apparent to those skilled in the art in view of this disclosure. The polyol and second reactant are reacted preferably in such proportions as to provide a molar equivalent ratio of polyol OH to combined alkoxy silicone —OQ' (as defined above) and diacid COOH from about 6:2 to about 6:5, respectively. Sufficient polyol must be used to provide a hydroxy functional product.

As noted above, the hydroxy functional polysiloxane is optionally urethane modified and typically may contain about 1-10 urethane groups per molecule. According to one embodiment of the invention, urethane groups are introduced by reaction of the above-described hydroxy functional polysiloxane with organic diisocyanate. Such reaction is carried out according to known methods, generally in the presence of solvents commonly employed for coating formulations such as toluene, xylene, methyl amyl ketone, and the like. Numerous suitable organic diisocyanates are readily commercially available and will be apparent to the skilled of the art in view of the present disclosure. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethanediisocyanate. As would be apparent to those skilled in the art, mixtures of various diisocyanates may also be employed as the diisocyanate compound used in forming urethane-modified polysiloxane. Typically, the hydroxy functional polysiloxane and diisocyanate are reacted in such proportions as to provide about 4-10 hydroxyl groups per isocyanate group.

While urethane modification may be introduced in the manner discussed above, according to an alternative embodiment of the invention the polyol reactant employed in reaction with the second reactant comprises urethane modified polyol. In this case, there is no need to react with diisocyanate the hydroxy functional polysiloxane. Employing urethane modified polyol is found to provide a final resin, i.e., graft copolymer, which is somewhat more flexible than when the urethane groups are introduced by reaction of the hydroxy functional polysiloxane with diisocyanate. Suitable urethane modified polyols are commercially available or readily prepared according to known methods. Exemplary urethane modified diols are made by reaction of diol and diisocyanate in a molar ratio of from about 4:1 to about 4:3, preferably from about 2:0.8 to about 2:1.2, more preferably about 2:1. Suitable diols and diisocyanates include those mentioned above. Such ratio of diol to diisocyanate (i.e., a molar excess of diol) causes the reaction product to be substantially free of unreacted isocyanate groups. This urethane modified diol is then combined with other portions of the polyol reactant (e.g., additional diol, triol, tetrol, etc.) for reaction with the second reactant, generally at elevated temperature and in the presence of a catalyst (as discussed above) to produce the hydroxy functional polysiloxane, specifically, a hydroxy functional urethane modified polysiloxane. It will be apparent to those skilled in the art, that urethane modified triol, urethane modified tetrols, etc. can be used in addition to or in lieu of urethane modified diol, according to the methods and guidelines discussed above, to provide hydroxy functional urethane modified polysiloxane.

Coating Compositions

According to another aspect of the invention, the above-described hydroxy functional polysiloxane graft copolymer is employed in an organic solvent based thermosetting coating composition together with suitable polyfunctional hydroxy-reactive crosslinking agent. Such crosslinking agent is selected, preferably, from aminoplast crosslinking agents and polyisocyanate crosslinking agents, either blocked or unblocked depending upon the intended application. Coating compositions of the invention can be formulated so as to be suitable for numerous different applications including, particularly, as motor vehicle body panel coatings. Thus, for example, a coating composition of the invention can be formulated as a primer or as a topcoat, such as a basecoat for a basecoat/clearcoat system, a clearcoat for a basecoat/clearcoat system, or as a one-coating topcoat. Moreover, any of these coatings can be formulated as either a one-component (i.e., resin and crosslinker combined) or a two-component (i.e., resin and crosslinker segregated) coating composition, except that the basecoat of a base/clear system generally would be formulated only as a one-component coating in view of the high pigment content thereof and the mixing and dispersion problems which would result in attempting to add the crosslinking agent at the time of application to a substrate. It is, of course, well known to the skilled of the art to employ unblocked polyisocyanate crosslinking agents generally only in two-component formulations to prevent premature reaction thereof with the hydroxy functional copolymer. Blocked polyisocyanate crosslinkers are employed in one-component coatings, but typically these are employed in primers since the two-component unblocked polyisocyanate coatings of the invention are found generally to provide better surface appearance. The amino resin crosslinking agents also are employed, typically, in one component formulations.

In a coating composition intended for use as a high solids base coat or clear coat of a base/clear automotive coating formulation, typically it is preferred that the graft copolymer have a number average molecular weight ($M_n$) between about 1,500 and about 3,000, more preferably between about 1,500 and about 2,500. Also, for such use the resin preferably has a hydroxy number between about 50 and about 150.

Crosslinking Agent

The crosslinking agent is generally included in compositions of the invention in an amount between about 5 and about 60 weight percent, preferably in an amount between about 20 and about 50 weight percent based on the weight of the copolymer and crosslinker combined. Selection of the optimal amount of crosslinking agent to be employed in the coating composition is dependent on the desired properties (e.g., flexibility) of the coating as well as its intended use, and selection of such amount would be within the skill of one in the art.

Polyisocyanate crosslinking agents are well known in the art and numerous suitable organic isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which can be employed are (1) aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, 4,4'-bis(isocyanate hexyl) methane, bis(2-isocyanate-ethyl)-fumarate, 2,6-diisocyanate methyl caproate, 2,2,4-(2,4,4)-trimethylhexamethylene diisocyanate, and dimer acid diisocyanates; (2) cycloaliphatic diisocyanates such as 1,3-cyclopentane diisocyanate, 1,4-cyclopentane diisocyanate, 1,2-cyclopentane diisocyanate, and methyl-cyclohexylene diisocyanate; (3) aromatic diisocyanates such as m-phenylene diisocyanate, p-phenylenediisocyanate, 4,4'-diphenyl diisocyanate; (4) aliphatic/aromatic diisocyanates such as 4,4'-diphenylene methane diisocyanates, 2,4- or 2,6-tolylene diisocyanate, 4,4'-toluidene diisocyanate, 1,4-xylylene diisocyanate; (5) nuclear substituted aromatic compounds such as dianisidine diisocyanate, 4,4'-diphenylether diisocyanate, chlorodiphenylene diisocyanate; (6) triisocyanates such as triphenylmethane-4,4',4"-triisocyanate, 1,3,5-triisocyanate benzene, 2,4,6-triisocyanate toluene; (7) tetraisocyanates such as 4,4'-diphenyl dimethylmethane 2,2',5,5'-tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triols, pentaerythritol and the like, as well as monoethers, e.g., diethylene glycol, tripropylene glycol and the like, and polyethers, i.e., alkylene oxide condensates of the above. While the polyisocyanate crosslinking agent may be any organic polyisocyanate as has been noted above, such crosslinking agents for coating composition to be employed as clear (top) coats are preferably aliphatic and cycloaliphatic polyisocyanates, due to their superior weatherability.

Especially preferred for use in clearcoat compositions of the invention are trimerized products of aliphatic diisocyanates such as 1,6-hexamethylene diisocyanate. Still another particularly preferred type of crosslinking agent is a polyisocyanate having a biuret structure. This type of polyisocyanate is well known, as are methods for making the same. Suitable such polyisocyanate crosslinking agents are high molecular weight biurets of 1,6-hexamethylene diisocyanate sold by Mobay Chemical Company under the trademarks Desmodur N and Desmodure L-2291. Exemplary of other biuret type polyisocyanates are those prepared in accordance with U.S. Pat. No. 3,976,622 to Wagner et al.

Blocked polyisocyanate crosslinking agents are well known to the skilled of the art and many suitable for use in compositions of the invention are commercially available or readily prepared and will be apparent from the present disclosure. More specifically, blocked polyisocyanate crosslinking agents comprise the reaction product of a polyisocyanate, such as those mentioned above, with a blocking agent, that is, an active hydrogen-bearing reactant. Exemplary blocked polyisocyanates are described, for example, in U.S. Pat. No. 4,497,938, which description is incorporated herein by reference. Blocked polyisocyanate crosslinking agents are used generally in the same proportions disclosed above for unblocked polyisocyanate crosslinking agents.

Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. Particularly preferred crosslinkers are the high solids melamine resins which have substantially 95+ percent nonvolatile content. For so-called "high solids" compositions of this invention, it should be recognized that it is important not to introduce extraneous diluents that lower the final solids content of the coating. Other suitable amine-aldehyde crosslinking agents will be apparent to one skilled in the art. Amine-aldehyde crosslinking agents are preferred for basecoat compositions of the invention. The amine-aldehyde crosslinking agent is generally included in a basecoat composition in an amount of between about 5 and about 60, preferably between about 20 and about 40 weight percent. However, selection of the particular amount of amine-aldehyde crosslinking agent to be employed in any such composition is dependent on the desired properties of the composition as well as its intended use and would be apparent to one skilled in the art.

Particular preferred crosslinking agents are the amino crosslinking agents sold by American Cyanamid under the trademark "Cymel". In particular, Cymel 301, 303, 325, 1130, 1156, 1161 and 1168 (trademarks) are alkalated melamine aldehyde resins useful in the compositions of this invention. The crosslinking reactions are catalytically accelerated by acids. One such catalyst, for example, which may be so employed is p-toluene sulfonic acid, which when employed is generally added to the composition is about 0.5% by weight based on the total weight of the graft copolymer and crosslinking agent.

Additional Materials

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (trademark, Spencer-Kellogg, Buffalo, N.Y.). It has been found that these high molecular weight polyurethanes may be employed in metallic flake pigment-bearing topcoat compositions is small amounts, typically up to about 15 weight percent based on the total weight of the polyester graft copolymer and crosslinking agent, to improve the orientation of the metallic flake pigment in the cured coating. It has been found that by including such linear polyurethane, for example, in a basecoat of a basecoat/clearcoat system, the depth of color and metallic glamour of the system may be improved.

Other materials which may be included in the coating compositions of this invention include, for example, catalysts, antioxidants, U.V. absorbers (for topcoats), solvents, surface modifiers and whitening agents. Solvents used in the coating composition of this invention are those which are commonly used, e.g., to facilitate spray application and high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate and mixtures thereof. The solvent in which the polysiloxane graft copolymer is prepared may be employed as a solvent for the composition, thus eliminating the need for drying the resin after preparation, if such is desired.

Typical ultraviolet light stabilizers that are useful in topcoat compositions of this invention are benzophenones such as dodecyl oxibenzophenone, 2,4-dihydroxybenzophenone, hydroxybenzophenones containing sulfonic groups, 2,4-dihydroxy-3',5'-ditertiarybutylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2-carboxybenzophenone, triazoles such as 2-phenyl-4-(2'4'-dihydroxybenzoyl)-triazoles, substituted benzotriazoles such as hydroxyphenyltriazoles such as 2-(2'-hydroxy-5'-methylphenyl)benzotriazole, 2-(2'-hydroxyphenyl)-benzotriazole, and 2-(2'-hydroxy-5'-octylphenyl)naphthiotriazole.

Another type of ultraviolet light stabilizer and one that is particularly preferred for use in the coatings of this invention is that taught in U.S. Pat. No. 4,480,084 entitled "Polymeric Light Stabilizers" to Kordomenos et al. These stabilizers contain the sterically hindered polyalkylpiperidine radical and at least two primary hydroxyl groups available for reacting with the crosslinking agent, e.g., amine-aldehyde or polyisocyanate, of the coating composition.

Typical antioxidants which may be employed in the coating composition include tetrakis alkylene (di-alkyl hydroxy aryl) alkyl ester alkanes such as tetrakis methylene 3-(3',5'-di-tert-butyl-4'-hydroxyphenyl)proprionate methane (available under the trademark Irganox 1010 from Ciba-Geigy Corp.). Also suitable are the reaction product of p-amino diphenylamine and glycidyl methacrylate, the reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilinophenyl)maleimide, alkylhydroxyphenyl groups bonded through carboalkoxy linkages to nitrogen atom of a heterocyclic nucleus containing an imidodicarbonyl group or an imidodithiocarbonyl group, 3,3-ditertbutyl-4-hydroxy-cinnamonitrile, ethyl-3,5-diterthexyl-4-hydroxy-cinnamate, substituted benzyl esters of beta-substituted (hydroxyphenyl)propionic acids, bis-(hydroxyphenylalkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphinites or phosphinates or phosphionites or phosphorothionates or phosphinothionates, diphenylbis(3,5-ditertbutyl-4-hydroxyphenoxy)silane, hydrocarbylhydroxyphenyl-dihydrocarbyldithio-carbamates such as 3,5-ditertbutyl-4-hydroxyphenyl dimethyldithiocarbamate and amino benzyl thioether.

In one preferred embodiment a base/clear topcoat system is provided, wherein both the basecoat and the clearcoat comprise a resin and crosslinker composition according to the invention. The basecoat would preferably contain only a benzotriazole U.V. stabilizer such as Tinuvin 328 (trademark, Ciba-Geigy, Ardsley, N.Y.), and the clearcoat would contain a benzotriazole U.V. stabilizer, e.g., Tinuvin 328, the polymeric hindered amine light stabilizer of the aforementioned U.S. Pat. No. 4,480,084 to Kordomenos et al and an antioxidant, e.g., Irganox-1010 (trademark; Ciba-Geigy). While preferred combinations of stabilizers and antioxidants have been described, these teachings are not meant to be limiting. Selection of suitable stabilizers and antioxidants is within the skill of one in the art.

Surface modifiers or wetting agents are common additives for liquid paint compositions. The exact mode of operation of these surface modifiers is not known, but it is thought that their presence contributes to better adhesion of coating compositions to the surface being coated and helps formation of thin coatings, particularly on metal surfaces. The choice of surface modifiers or wetting agents is dependent upon the type(s) of surface to be coated. Selection of appropriate surface modifiers is well within the skill of the art. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among the many such materials which are known are non-aqueous dispersions (NAD's) such as described by Porter (S. Porter, Jr., and B. N. McBane, U.S. Pat. No. 4,025,474, May 24, 1977). These particle dispersions may be included generally in an amount up to 15% by weight of the total composition. Other types of NAD's, such as described by D. L. Maker and S. C. Peng in U.S. Pat. No. 3,814,721, June 4, 1974 or by S. K. Horvath in U.S. Pat. No. 4,415,681, Nov. 15, 1983, also may be included in the coating compositions.

Coating compositions according to certain embodiments of the invention may contain pigments. Thus, for example, primer compositions and the basecoat of a base/clear system may comprise any of the wide variety of suitable pigments which are known to the art and readily commercially available. Selection of suitable pigments and the amounts of same will depend largely on the intended use and desired properties of the coating, for example, desired color, hiding properties, etc., and is within the skill of those in the art.

The coating composition can be applied by conventional methods known to those in the art. These methods include roll coating, spray coating, dipping or brushing. The particular application technique chosen will depend upon the particular substrate to be coated and the environment in which the coating operation takes place. Preferred techniques for applying these coating compositions, particularly when applying the same to automobiles, is spray coating through the nozzle of the spray gun. A basecoat, for example, can be applied as a single component by means of a single component spray gun. On the other hand, in spray applying a two component clearcoat composition, the polysiloxane graft copolymer and additives such as pigments, U.V. absorbers, antioxidants and other nonreactive materials are admixed with a solvent. These materials are fed as one component of a two component system into a spray gun which combines the materials as they are sprayed into the automotive substrate. The other material is the polyisocyanate crosslinking agent, which may or may not be cut with a suitable nonreactive solvent.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

Hydroxy functional polysiloxane graft copolymer within the scope of the present invention was prepared according to the procedure of this Example.

Part A

Hydroxy functional polysiloxane reactant was prepared as follows. Into a suitable reactor were charged 255 parts phthalic anhydride, 720 parts Esterdiol-204 (trademark; Union Carbide Co., Danbury, Conn.; 2,2-dimethyl-3-hydroxypropyl-2-dimethyl-3-hyroxypropionate), 440 parts trimethylolpropane, 80 parts adipic acid, and 172 parts SR-191 (trademark; General Electric Co., Waterford, N.Y.; phenyl-methyl silicone resin). The above mixture was heated to 300°–350° F. and methanol and water distilled off until the acid number dropped to 1.0. The mixture was cooled to 200° F., at which time the batch was thinned with 333 parts xylene. To this mixture was added dropwise 167 parts Desmodur W (trademark; Mobay Chemical Co., diisocyanate) over a period of 2 hours. The batch was post-reacted at 210° F. until no NCO peak was observed in an infrared spectrum.

Part B

Hydroxy functional, carbon-carbon double bond bearing, branched polysiloxane macromonomer was prepared as follows. Into a suitable reactor were charged 800 parts of the resin of Part A, 0.7 part hydroquinone, and 0.05 parts stannous octoate. This mixture was heated to 200° F. at which time 62.6 parts isocyanatoethylmethacrylate was added dropwise over a period of 2 hours. The mixture then was post-reacted at 200° F. until no NCO peak was observed in an infrared spectrum.

Part C

Hydroxy functional polysiloxane graft copolymer was prepared as follows. Into a suitable reactor was charged 194 parts Exxate 600 (trademark; Exxon Chemical Co. Houston, Tex.; oxohexylacetate), which solvent was heated to 300° F. At this time a mixture of 600 parts of the resin of Part B, 176 parts iso-butylmethacrylate, 48 parts styrene, 21 parts hydroxyethylacrylate, 16.2 parts acrylic acid, and 31.4 parts Lupersol 533-M-75 (trademark; Lucidol Pennwalt Chemical Co., Buffalo, N.Y.; ethyl-3,3-di-(t-amylperoxy)butyrate) was added over a period of 3–4 hours. The reaction mixture was heated at 300° F. for 30 minutes. Then an additional 3.6 parts Lupersol 533-M-75 was added. The mixture was post-reacted at 300° F. for an additional 3 hours and then cooled to afford a resin with a viscosity of X at 65.3% non-volatiles.

EXAMPLE II

Hydroxy functional polysiloxane graft copolymer within the scope of the present invention was prepared according to the procedure of this Example.

Part A

Hydroxy functional polysiloxane reactant was prepared as follows. Into a suitable reactor were charged 485 parts triethylene glycol, 71 parts trimethylolpropane, 235 parts dimethyl-1,4-cyclohexanedicarboxylate, 0.87 parts of a para-toluene sulfonic acid solution (30% solution in butanol), and 88 parts SY-550 (trademark; SWS Corporation, Wacker Chemie, Munich, Germany; alkoxysilane). The mixture was heated to 350° F. and water and methanol distilled off until the acid number dropped to 2.7.

Part B

Hydroxy functional, carbon-carbon double bond bearing, branched polysiloxane macromonomer was prepared as follows. Into a suitable reactor were charged 747 parts of the resin of Part A, 0.75 parts hydroquinone, and 0.05 parts T-12 catalyst (trademark; M&T Catalyst Co., Rahway, N.J.). This mixture was heated to 200° F., at which time 68.7 parts meta-TMI (trademark; American Cyanamid Co., Wayne, N.J.; 1-1-isocyanato-1-methylethyl)-3-(1-methylethenyl)benzene) was added dropwise over a period of 1 hour. The mixture then was post-reacted at 200° F. until no NCO peak was observed in an infrared spectrum.

Part C

Hydroxy functional polysiloxane graft copolymer was prepared as follows. Into a suitable reactor were charged 110 parts Exxate 600 (trademark; Exxon Chemical Co., Houston, Tex.; oxohexylacetate), and 19.4 parts cumene hydroperoxide. The solution was heated to 300° F., at which time a mixture of 539 parts of the resin of Part B, 145 parts iso-butylmethacrylate, 18 parts hydroxyethylacrylate, 40 parts styrene, 13 parts acrylic acid, and 23 parts t-butylperbenzoate was added over a period of 3 hours. The reaction mixture was heated at 300° F. for 3 hours and then cooled to afford a resin with a viscosity of L at 65.3% non-volatiles.

EXAMPLE III

Hydroxy functional polysiloxane graft copolymer within the scope of the present invention was prepared according to the procedure of this Example.

Part A

Hydroxy functional polysiloxane reactant was prepared as follows. Into a suitable reactor were charged 720 parts Esterdiol-204 (trademark, Union Carbide Co., 2,2-dimethyl-3-hydroxypropyl-2-dimethyl-3-hydroxypropionate), 490 parts Tone 0301 (trademark; Union Carbide Co., polycaprolactone triol), 255 parts phthalic anhydride, 80 parts adipic acid, and 287 parts EV33/400 (trademark; Goldschmidt Chemical Corp., Hopewell, Va.; silicone resin). This mixture was heated to 350°–400° F. stepwise and a mixture of water/methanol was distilled off until the acid number dropped to 9. The mixture was cooled to 150° F., at which time 122 parts Desmodur W (trademark; Mobay Chemical Co., Pittsburgh, PA; diisocyanate) was added dropwise over a 2 hour period. The reaction mixture was post-reacted at 200° F. until no NCO peak appeared in an infrared spectrum.

Part B

Hydroxy functional, carbon-carbon double bond bearing, branched polysiloxane macromonomer was prepared as follows. Into a suitable reactor were charged 550 parts of the resin of Part A, 0.6 parts hydroquinone, 0.06 parts tetraisopropyltitanate, and 0.05 parts stannous octoate. This mixture was heated to 200° F. at which time 39.1 parts 1-(1-isocyanato-1-methylethyl)-3-(1-methylethenyl)benzene was added dropwise over a period of 20 minutes. The reaction mixture then was post-reacted at 200° F. until no NCO peak appeared in an infrared spectrum.

Part C

Hydroxy functional polysiloxane graft copolymer was prepared as follows. Into a suitable reactor was charged 110 parts Exxate 600 (trademark; Exxon Chemical Co.; oxohexylacetate), and 19.4 parts cumene hydroperoxide. The solution was heated to 310° F. at which time a mixture of 420 parts of the resin of Part B, 145 parts iso-butylmethacrylate, 18 parts hydroxyethylacrylate, 40 parts styrene, 13 parts acrylic acid and 23 parts t-butylperbenzoate was added dropwise over a period of 2 hours. The reaction mixture was post-reacted at 320° F. for 2 hours and then cooled to afford a resin with a $Z_3$–$Z_4$ viscosity at 71.3% non-volatiles.

EXAMPLE IV

Hydroxy functional polysiloxane graft copolymer within the scope of the present invention was prepared according to the procedure of this Example.

Part A

Hydroxy functional polysiloxane reactant was prepared as follows. Into a suitable reactor were charged 720 parts Esterdiol-204 (trademark; Union Carbide Co.; 2,2-dimethyl-3-hydroxypropyl-2-dimethyl-3-hydroxypropionate), 490 parts Tone 0301 (trademark; Union Carbide Co.; polycaprolactone triol), 255 parts phthalic anhydride, 80 parts adipic acid, and 287 parts ZV33/400 (trademark; Goldschmidt Chemical Co.; silicone resin). This mixture was heated to 350°–400° F. stepwise and a mixture of water/methanol distilled off until the acid number dropped below 10.

Part B

Hydroxy functional, carbon-carbon double bond bearing, branched polysiloxane macromonomer was prepared as follows. Into a suitable reaction vessel were charged 450 parts of the resin of Part A, 0.5 parts hydroquinone, and 0.05 parts stannous octoate. The mixture was heated to 160° F. and 45 parts 1-(1-isocyanato-1-methylethyl)-3-(1-methylethenyl)benzene was added dropwise over a period of 30 minutes. The reaction mixture was post-reacted at 200° F. until no NCO peak appeared in an infrared spectrum.

Part C

Hydroxy functional polysiloxane graft copolymer was prepared as follows. Into a suitable reactor were charged 110 parts Exxate 600 (trademark; Exxon Chemical Co.; oxohexylacetate) and 19.4 parts cumene hydroperoxide. The solution was heated to 300° F., at which time a mixture of 425 parts of the resin of Part B, 145 parts iso-butylmethacrylate, 18 parts hydroxyethylacrylate, 40 parts styrene, 13 parts acrylic acid, and 23 parts t-butylperbenzoate was added dropwise over a period of 2.5 hours. The reaction mixture was post-cooked at 310° F. for 2 hours and then cooled to afford a resin with a Y viscosity at 69.5% non-volatiles.

EXAMPLE V

Hydroxy functional polysiloxane graft copolymer within the scope of the present invention was prepared according to the procedure of this Example.

Part A

Hydroxy functional, carbon-carbon double bond bearing, branched polysiloxane macromonomer was prepared as follows. Into a suitable reactor were charged 450 parts of the resin of Example IV, Part A, 0.5 parts hydroquinone, and 0.05 parts stannous octoate. The solution was heated to 150° F. and 45 parts isocyanatoethylmethacrylate was added dropwise over a period of 1 hour. The reaction mixture was post-reacted at 190°–200° F. until no NCO peak appeared in an infrared spectrum.

Part B

Hydroxy functional polysiloxane graft copolymer was prepared as follows. Into a suitable reactor were charged 110 parts Exxate 600 (trademark, Exxon Chemical Co.; oxohexylacetate) and 19.4 parts cumene hydroperoxide. The solution was heated at 300° F. and a mixture of 400 parts of the resin of Part A, 145 parts iso-butylmethacrylate, 18 parts hydroxyethylacrylate, 40 parts styrene, 13 parts acrylic acid, and 23 parts 5-butylperbenzoates was added dropwise over a period of 2.5 hours. The reaction mixture was post-reacted at 320° F. for 2 hours and then cooled to afford a resin with a $Z_2$ viscosity at 71% non-volatiles.

EXAMPLES VI–X

Primer formulations according to the present invention are shown in Table A. The primers are applied over Bonderite steel panels and baked at 380° F. for 20 minutes to yield fexible, durable coatings which exhibit excellent adhesion and hardness.

Part A. Taupe Millbase Formulation

The following ingredients were charged into a ball mill and gound to a suitable Hegman gauge level.

| Charge | Parts |
|---|---|
| Resin of Example V, Part B | 146 |
| Methyl amyl ketone | 96 |
| Butyl cellosolve acetate | 106 |
| Anti-skinning agent[1] | 2 |
| Barium sulfate | 526 |
| Titanuim dioxide | 72 |
| Zinc chromate | 10 |
| Talc #399[2] | 5 |
| Amorphous silica[3] | 23 |
| Black iron oxide | 0.5 |
| Polyethylene-wax | 25 |
| Anti-settling and wetting agent[4] | 6.5 |
| Red iron oxide | 14 |

[1]Skino #2 (trademark) available from Mooney Chemical Company.
[2]Available from Whittaker, Clark, and Daniels.
[3]Imsil A-10 (trademark) available from Illinois Minerals Co.
[4]Anti-terra-U (trademark) available from Byk-Gulden Inc.

Part B. Primer Compositions

Primer compositions are formulated as shown in Table A, below.

TABLE A

| | EXAMPLE | | | | |
|---|---|---|---|---|---|
| | VI | VII | VIII | IX | X |
| Component | Parts | | | | |
| Resin of Example I, Part C | 2027 | | | | |
| Resin of Example II, Part C | | 2027 | | | |
| Resin of Example III, Part C | | | 1857 | | |
| Resin of Example IV, Part C | | | | 1905 | |
| Resin of Example V, Part B | | | | | 1865 |
| Taupe Millbase of Part A | 7850 | 7850 | 7850 | 7850 | 7850 |
| Cymel 1133[1] | 502 | 502 | 502 | 502 | 502 |
| Resimene 717[2] | 500 | 500 | 500 | 500 | 500 |
| Catalyst solution[3] | 246 | 246 | 246 | 246 | 246 |
| Cargill XP-5770-85[4] | 827 | 827 | 827 | 827 | 827 |
| K-Flex[5] | 462 | 462 | 462 | 462 | 462 |
| Flow control additive | 248 | 248 | 248 | 248 | 248 |
| Modarez TMF 25[6] | 17 | 17 | 17 | 17 | 17 |
| Polybutylacrylate | 100 | 100 | 100 | 100 | 100 |
| Manganese-napththenate | 30 | 30 | 30 | 30 | 30 |
| Butanol | 100 | 100 | 100 | 100 | 100 |

The above compositions are adjusted to 28 sec. #4 Ford Cup (80° F.) with toluene prior to application to the substrate.

[1]Trademark; American Cyanamid Co.; alkylated melamine.
[2]Trademark; Monsanto Chemical Co.; alkylated melamine.
[3]Acid catalyst solution of following composition:

TABLE A-continued

| | Parts |
|---|---|
| Butyl acetate | 450 |
| Exhanol | 100 |
| VMP naphtha | 256 |
| Methanol | 44 |
| Deionized water | 50 |
| Nacure 2501[7] | 100 |

[4]Trademark; Cargill; high solids polyester.
[5]Trademark; King Industries; polyester polyol.
[6]Trademark; Synthron Co.; flow control and levelling agent.
[7]Trademark; King Industries; blocked acid catalyst.

EXAMPLES XI–XV

Flexible enamel coating compositions within the scope of the present invetion were formulated as shown in Table B. The coating compositions were applied over metal and plastic substrates to afford coatings which were flexible and durable.

Part A. White Millbase Formulation

| | Parts |
|---|---|
| Butylacetate | 57 |
| ICI9000[1] (10% in butylacetate) | 5.7 |
| EZ-100[2] | 28.5 |
| Xylene | 3986 |
| Butanol | 8087 |
| Cymel 1161[3] | 112 |
| Cymel 1130[3] | 4485 |
| Titanium dioxide | 15991 |
| Resin of Example III, Part C | 3921 |

[1]Trademark; ICI Americas Co., Wilmington, Delaware; wetting agent.
[2]Trademark; United Catalysts, Inc.; quaternary ammonium complex of bentonite clay.
[3]Trademark; American Cyanamid Co.; alkylated melamine.

The above components were mixed and ground on a ball mill for 16 hours then passed through a sand grinder until a suitable Hegman gauge level was achieved.

Part B. Flexible Enamel Compositions

Enamel coating compositions were formulated as shown in Table B, below.

TABLE B

| | EXAMPLE | | | | |
|---|---|---|---|---|---|
| | XI | XII | XII | XIV | XV |
| Component | Parts | | | | |
| Resin of Example I, Part C | 139 | | | | |
| Resin of Example II, Part C | | 139 | | | |
| Resin of Example III, Part C | | | 127 | | |
| Resin of Example IV, Part C | | | | 131 | |
| Resin of Example V, Part B | | | | | 128 |
| Para-toluene sulfonic acid (40% solution in butanol) | 4.5 | 4.5 | 4.5 | 4.15 | 4.5 |
| UV absorber solution[1] | 23 | 23 | 23 | 23 | 23 |
| Polybutylacrylate | 0.9 | 0.9 | 0.9 | 0.9 | 0.9 |
| Acryloid-B82 (25% in xylene)[2] | 2.8 | 2.8 | 2.8 | 2.8 | 2.8 |
| White millbase of Part A | 116 | 116 | 116 | 116 | 116 |
| Cymel 1130[3] | 19 | 19 | 19 | 19 | 19 |
| Cymel 304[3] | 34 | 34 | 34 | 34 | 34 |
| Butanol | 13.8 | 13.8 | 13.8 | 13.8 | 13.8 |

The compositions were adjusted to 26 sec. #4 Ford Cup (80°) with a 60/40 w/w mixture, respectively, of butanol and Exxate

TABLE B-continued 700 (trademark; Exxon Chemical Co.; oxoheptylacetate).

[1] U-V absorber solution:

| | Parts |
|---|---|
| butanol | 2305 |
| Tinuvin 440[4] | 500 |
| GGL 1130[5] | 500 |
| Irganox 1010[6] | 55 |

[2] Trademark; Rohm and Haas Co.; Philadelphia, PA; acrylic polymer.
[3] Trademark; American Cyanamid Co.; alkylated melamine.
[4] Trademark; Ciba-Geigy Co.; H hindered amine light stabilizer
[5] Trademark; Ciba-Geigy Co.; UV absorber.
[6] Trademark; Ciba-Geigy; Co.; antioxidant.

TABLE C

| Component | EXAMPLE | | | | |
|---|---|---|---|---|---|
| | XVI | XVII | XVIII | XIX | XX |
| | Parts | | | | |
| Resin of Example I, Part C | 1069 | | | | |
| Resin of Example II, Part C | | 1069 | | | |
| Resin of Example III, Part C | | | 979 | | |
| Resin of Example IV, Part C | | | | 1004 | |
| Resin of Example V, Part B | | | | | 983 |
| Aluminum stearate | 800 | 800 | 800 | 800 | 800 |
| Tinuvin 328[1] (30% in xylene) | 400 | 400 | 400 | 400 | 400 |
| K-flex[2] | 160 | 160 | 160 | 160 | 160 |
| Flow control additive[3] | 800 | 800 | 800 | 800 | 800 |
| Butyl cellosolve acetate | 160 | 160 | 160 | 160 | 160 |
| Acid catalyst[4] | 120 | 120 | 120 | 120 | 120 |
| Cymel 1130[5] | 437 | 437 | 437 | 437 | 437 |
| Esterdiol[6] solution | 37 | 37 | 37 | 37 | 37 |
| Cymel 1161[5] | 293 | 293 | 293 | 293 | 293 |
| Aluminum millbase[7] | 1024 | 1024 | 1024 | 1024 | 1024 |

The above compositions were adjusted with methyl amyl ketone to 15 sec. #4 Ford Cup (80° F.).

[1] Trademark; Ciba Geigy Co., UV absorber.
[2] Trademark; King Industries; polyester polyol.
[3] Microgel prepared according to U.S. Pat. No. 4,425,450, Examples 1-3.
[4] Para-toluene sulfonic acid (40% in butanol).
[5] Trademark; American Cyanamid Co.; alkylated melamine.
[6] Trademark; Union Carbide Co.; 60% solution of Esterdiol-204 in iso-propanol/xylene (50/50 w/w/).
[7] Aluminum millbase formulations:

| | Parts |
|---|---|
| aluminum paste | 3328 |
| Cymel 1161[5] | 1281 |
| polyethylene wax | 225 |
| Nuosperse 700[8] | 57 |

[8] Trademark; Tennaco Chemical Co.; Piscataway, New Jersey; wetting agent (50% in xylene).

TABLE D

| Component | EXAMPLE | | | | |
|---|---|---|---|---|---|
| | XXI | XXII | XXIII | XXIV | XXV |
| | Parts | | | | |
| Resin of Example I, Part C | 729 | | | | |
| Resin of Example II, Part C | | 729 | | | |
| Resin of Example III, Part C | | | 668 | | |
| Resin of Example IV, Part C | | | | 685 | |
| Resin of Example V, Part B | | | | | 671 |
| Cymel 1161[1] | 211 | 211 | 211 | 211 | 211 |
| Polybutylacrylate | 12.1 | 12.1 | 12.1 | 12.1 | 12.1 |
| Para-toluene sulfonic acid (40% in butanol) | 22.8 | 22.8 | 22.8 | 22.8 | 22.8 |
| Acryloid B-82[2] (50% in xylene) | 18.3 | 18.3 | 18.3 | 18.3 | 18.3 |
| EZ-100[3] (5% in xylene) | 9.1 | 9.1 | 9.1 | 9.1 | 9.1 |
| UV absorber solution[4] | 105 | 105 | 105 | 105 | 105 |
| Methanol | 60.8 | 60.8 | 60.8 | 60.8 | 60.8 |
| Tetralin[5] | 133 | 133 | 133 | 133 | 133 |

The above compositions were adjusted to 24 sec. #4 Ford Cup (80° F.) with butyl acetate/butyl cellosolve acetate (70/30 w/w).

[1] Trademark; American Cyanamid Co.; alkylated melamine.
[2] Trademark; Rohm and Haas Co.; acrylic polymer.
[3] Trademark; United Catalysts Inc.; quaternary ammonium complex of bentonite clay.
[4] UV absorber solution:

| | Parts |
|---|---|
| butanol | 2305 |
| Tinuvin 440[6] | 500 |
| CGL 1130[7] | 500 |
| Irganox 1010[8] | 55 |

[5] Trademark; Henkel; tetrahydronaphthalene
[6] Trademark; Ciba Geigy Co.; hindered amine light stabilizer
[7] Trademark; Ciba Geigy Co.; UV absorber.
[8] Trademark; Ciba Geigy Co.; antioxidant.

TABLE E

| Component | EXAMPLE | | | | |
|---|---|---|---|---|---|
| | XXVI | XXVII | XXVIII | XXIX | XXX |
| | Parts | | | | |
| Resin of Example I, Part C | 76.4 | | | | |
| Resin of Example II, Part C | | 76.4 | | | |
| Resin of Example III, Part C | | | 70 | | |
| Resin of Example IV, Part C | | | | 71.8 | |
| Resin of Example V, Part B | | | | | 70.3 |
| Polybutylacrylate | 1.6 | 1.6 | 1.6 | 1.6 | 1.6 |
| Tetralin[1] | 5.4 | 5.4 | 5.4 | 5.4 | 5.4 |
| UV absorber/stabilizer[2] | 13.9 | 13.9 | 13.9 | 13.9 | 13.9 |
| Xylene | 30 | 30 | 30 | 30 | 30 |
| Stannous octoate | 0.4 | 0.4 | 0.4 | 0.4 | 0.4 |
| Flow control additive[3] | 25 | 25 | 25 | 25 | 25 |
| Desmodur N-3390[4] | 28 | 28 | 28 | 28 | 28 |

The above compositions were adjusted to 22 sec. #4 Ford Cup (80° F.) with a 40/60 w/w blend, respectively, of butyl acetate with Exxate 600 (trademark; Exxon Chemical Co.; oxohexylacetate).

[1] Trademark; Henkel; tetrahydronaphthalene
[2] UV absorber/stabilizer package:

| | Parts |
|---|---|
| Tinuvin 079L[5] | 25 |
| Tinuvin 900[6] | 8 |
| Tinuvin 328[6] | 7 |
| Xlyene | 60 |

[3] Flow control additive: Tego Flow ZFS 460; Goldschmidt Chemical Co., acrylic polymer
[4] Trademark; Mobay Chemical Co.; hexamethylene diisocyanate.
[5] Trademark; Ciba Geigy Co.; hindered amine light stabilizer
[6] Trademark; Ciba Geigy Co.; UV absorber

EXAMPLES XXXI-XXXVIII

Metal and plastic substrates were coated with a one component clearcoat coating composition of the invention applied wet-on-wet over a one component basecoat coating composition of the invention. The cured coatings each had a basecoat film thickness of about 0.6-0.8 mil and a clearcoat film thickness of about 1.8-2.0 mils. The bake schedule for curing the coatings was 250° F. for 30 minutes. The cured coatings were tested for percent elongation, resistance to methylethylketone solvent (10 double rubs) and resistance to ultraviolet radiation. In Table F, below, the basecoat and clearcoat resins are identified by the foregoing Example according to which it was prepared. Test results for each coating also are shown in Table F. (In Table F, "EXC" denotes an excellent test result.)

TABLE F

| Example | Basecoat Resin | Clearcoat Resin | Percent Elongation | MEK Resistance | QUV (1000 Hours) |
|---|---|---|---|---|---|
| XXXI | XVI | XXI | 50 | EXC | Good |
| XXXII | XVII | XXII | 60 | EXC | Good |
| XXXIII | XVIII | XXIII | 60 | EXC | Good |
| XXXIV | XIX | XXIV | 65 | EXC | EXC |
| XXXV | XX | XXV | 65 | EXC | EXC |
| XXXVI | XVII | XXIII | 60 | EXC | Good |
| XXXVII | XVII | XXIV | 65 | EXC | Good |
| XXXVIII | XVII | XXV | 65 | EXC | EXC |

EXAMPLE XXXIX-XLIII

Metal and plastic substrates were coated with a two component clearcoat coating composition of the invention applied wet-on-wet over a one component basecoat coating composition of the invention. The cured coatings each had a basecoat film thickness of about 0.6–0.8 mil and a clearcoat film thickness of about 1.8–2.0 mils. The bake schedule for curing the coatings was 250° F. for 30 minutes. The cured coatings were tested for percent elongation, resistance to methylethylketone solvent (10 double rubs) and resistance to ultraviolet radiation. In Table G, below, the basecoat and clearcoat resins are identified by the foregoing Example according to which it was prepared. Test results for each coating also are shown in Table G. (In Table G, "EXC" denotes an excellent test result.)

TABLE G

| Example | Basecoat Resin | Clearcoat Resin | Percent Elongation | MEK Resistance | QUV (1000 Hours) |
|---|---|---|---|---|---|
| XXXIX | XVI | XXVI | 80 | EXC | EXC |
| XL | XVII | XXVII | 90 | EXC | EXC |
| XLI | XVIII | XXVIII | 90 | EXC | EXC |
| XLII | XIX | XXIX | 95 | EXC | EXC |
| XLIII | XX | XXX | 95 | EXC | EXC |

INDUSTRIAL APPLICABILITY

It will be apparent from the foregoing that this invention has industrial applicability as a protective coating, for example on motor vehicle body panels and like applications and provides a flexible, durable coating for metal, plastic and other substrates.

We claim:

1. Hydroxy functional polysiloxane graft copolymer suitable for flexible, thermosetting coating compositions over metal and plastic substrates, which copolymer has number average molecular weight between about 1,300 and about 15,000, has a hydroxyl number between about 30 and about 300, and is the reaction product of carbon-carbon double bond-reactive monoethylenically unsaturated monomer with hydroxy functional carbon-carbon double bond-bearing branched polysiloxane macromonomer, under free radical polymerization reaction conditions, said monomer bearing substantially no functionality which is substantially reactive with hydroxy functionality of said macromonomer under said reaction conditions, and said macromonomer being the reaction product of (i) isocyanato monomer having the formula:

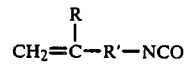

wherein R is hydrogen or $C_1$ to about $C_7$ alkyl, and R' is a divalent linking moiety which does not substantially interfere with the reactivity of either the isocyanate or the ethylenic double bond of said isocyanato monomer with (ii) hydroxy functional polysiloxane reactant having about 0–10 urethane groups per molecule.

2. The hydroxy functional polysiloxane graft copolymer of claim 1, wherein said divalent linking moiety, R', of said isocyanato monomer is $C_1$ to about $C_7$ alkylene, $COO(CH_2)_n$, n being from 1 to about 7, $CH(CH_3)C_6H_4C(CH_3)_2$ or $COO(CH_2)_mOCONHC_6H_x$-$-Q_y$, m being from 1 to about 7, x and y together equaling 6 and each Q being any substituent group which does not substantially interfere with the reactivity of either the isocyanate group or the ethylenic double bond of said isocyanato monomer.

3. The hydroxy functional polysiloxane graft copolymer of claim 2, wherein R is selected from H or $CH_3$ and said divalent linking moiety, R', is $COO(CH_2)_mOCONHC_6H_5$-$CH_3$.

4. The hydroxy functional polysiloxane graft copolymer of claim 1, wherein said isocyanato monomer is selected from the the group consisting of isocyanato ethyl methacrylate, isocyanato propyl methacryate, 1-(1-isocyanato-1-methylethyl)-3-(1-methylethenyl)-benzene, and any compatible mixture thereof.

5. The hydroxy functional polysiloxane graft copolymer of claim 1, wherein said isocyanato monomer is the reaction product of hydroxy alkyl acrylate with diisocyanate.

6. The hydroxy functional polysiloxane graft copolymer of claim 5, wherein said hydroxy alkyl acrylate consists essentially of hydroxy ethyl acrylate.

7. The hydroxy functional polysiloxane graft copolymer of claim 1, wherein said isocyanato monomer and said hydroxy functional polysiloxane reactant are reacted in approximately 1:1 molar ratio.

8. The hydroxy functional polysiloxane graft copolymer of claim 1, wherein said carbon-carbon double bond-reactive monoethylenically unsaturated monomer is selected from the group consisting of alkylacrylate, alkyl methacrylate, hydroxyalkylacrylate, hydroxyalkylmethacrylate and mixtures thereof, wherein each alkyl and hydroxyalkyl moiety has from one to about seven carbons.

9. The hydroxy functional polysiloxane graft copolymer of claim 1, wherein said carbon-carbon double bond-reactive monoethylenically unsaturated monomer is selected from the group consisting of acrylic acid, methacrylic acid, styrene, methylacrylate, ethylacrylate, propylacrylate, butylacrylate, methylmethacrylate, ethylmethacrylate, propylmethacrylate, butylmethacrylate, hydroxyethylacrylate, hydroxypropylacrylate, hydroxybutylacrylate, hydroxyethylmethacrylate, hydroxypropylmethacrylate, hydroxybutylmethacrylate, and any mixture thereof.

10. The hydroxy functional polysiloxane graft copolymer of claim 1, wherein said hydroxy functional polysiloxane reactant comprises the reaction product of (i) polyol comprising at least about 5 percent by weight triol with (ii) second reactant selected from an alkoxy silicone or a blend of a dicarboxylic acid and alkoxy silicone, said alkoxy silicone having number average molecular weight between about 350 and about 10,000 and having the general formula:

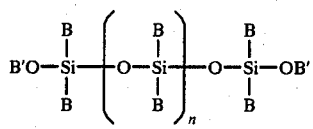

wherein each B is independently selected from alkyl, alkoxy, aryl or aryloxy; each B' is alkyl; and n is 1 to about 75; and said dicarboxylic acid is selected from the group consisting of saturated and unsaturated, cyclic and acyclic aliphatic dicarboxylic acids, aromatic dicarboxylic acids, suitable anhydrides thereof, and mixtures thereof.

11. The hydroxy functional polysiloxane graft copolymer of claim 10, wherein said alkoxy silicone formula variable n has a value of from 1 to about 25.

12. The hydroxy functional polysiloxane graft copolymer of claim 10, wherein said alkoxy silicone has siloxane content of about 89%, methoxy content of about 15%, and number average molecular weight of about 600.

13. The hydroxy functional polysiloxane graft copolymer of claim 10, wherein said dicarboxylic acid, if any, comprises substantially saturated, acyclic, aliphatic dimer acids of about 6 to 36 carbons.

14. The hydroxy functional polysiloxane graft copolymer of claim 10, wherein said dicarboxylic acid is selected from the group consisting of adipic acid, azelaic acid, sebasic acid, dodecane dicarboxylic acid, phthalic anhydride and any mixture thereof.

15. The hydroxy functional polysiloxane graft copolymer of claim 10, wherein said polyol comprises diol and triol in hydroxy equivalent ratio of from about 4:1 to about 1:4.

16. The hydroxy functional polysiloxane graft copolymer of claim 15, wherein said triol is selected from the groups consisting of trimethylol propane, polycaprolactone triol, and any mixture thereof.

17. The hydroxy functional polysiloxane graft copolymer of claim 15, wherein said diol is aliphatic diol of the general formula HO—R"—OH, wherein R" is a divalent, aliphatic, linking moiety substantially unreactive with said alkoxy silicone and said dicarboxylic acid.

18. The hydroxy functional polysiloxane graft copolymer of claim 15, wherein said diol has molecular weight of about 60–500 and is selected from the group consisting of alkyl glycol of about 2–7 carbons, and any mixture thereof.

19. The hydroxy functional polysiloxane graft copolymer of claim 10, wherein said hydroxy functional polysiloxane reactant is urethane modified, said polyol comprising the reaction product of organic diisocyanate with polyhydroxy reactant.

20. The hydroxy functional polysiloxane graft copolymer of claim 19, wherein said diisocyanate is selected from the group consisting of phenylene diisocyanate, biphenyl diisocyanate, toluene diisocyanate, isophorone diisocyanate, 3,3'-dimethyl-4,4'-biphenylene diisocyanate, diisocyanatoalkane wherein the alkane moiety has about three to about ten carbons, and a compatible mixture of any of them.

21. The hydroxy functional polysiloxane graft copolymer of claim 1, wherein said hydroxy functional polysiloxane reactant is urethane modified, comprising the reaction product of organic diisocyanate with the reaction product of (i) polyol comprising at least about 5 percent by weight triol with (ii) second reactant selected from an alkoxy silicone or a blend of a dicarboxylic acid and alkoxy silicone, said alkoxy silicone having number average molecular weight between about 350 and about 10,000 and having the general formula:

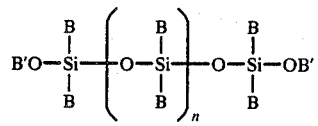

wherein each B is independently selected from alkyl, alkoxy, aryl or aryloxy; each B' is alkyl; and n is 1 to about 75; and said dicarboxylic acid being selected from the group consisting of saturated and unsaturated, cyclic and acyclic aliphatic dicarboxylic acids, aromatic dicarboxylic acids, suitable anhydrides thereof, and any mixture thereof.

22. Hydroxy functional carbon-carbon double bond-bearing branched polysiloxane macromonomer comprising the reaction product of (i) isocyanato monomer having the formula:

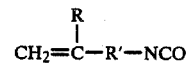

wherein R is hydrogen or $C_1$ to about $C_7$ alkyl, and R' is a divalent linking moiety which does not substantially interfere with the reactivity of either the isocyanate group or the ethylenic double bond of said isocyanato monomer, with (ii) hydroxy functional polysiloxane reactant having about 0–10 urethane groups per molecule.

23. The hydroxy functional carbon-carbon double bond-bearing branched polysiloxane macromonomer of claim 22, wherein said hydroxy functional polysiloxane reactant comprises oligomeric polysiloxane having a number average molecular weight between about 1,000 and about 10,000 and a hydroxyl number between about 30 and about 300.

24. The hydroxy functional carbon-carbon double bond-bearing branched polysiloxane macromonomer of claim 22, wherein said isocyanato acrylate is selected from the group consisting of isocyanato ethyl methacrylate, isocyanato propyl methacrylate, 1-(1-isocyanato-1-methylethyl)-3-(1-methylethenyl)benzene, and any compatible mixture thereof.

25. A solvent based flexible coating composition, useful as an automotive coating on metal and plastic substrates, comprising:

(A) hydroxy functional polysiloxane graft copolymer of number average molecular weight between about 1,300 and about 15,000, having a hydroxyl number between about 30 and about 300, and being the reaction product of carbon-carbon double bond-reactive monoethylenically unsaturated monomer with hydroxy functional carbon-carbon double bond-bearing branched polysiloxane macromonomer, under free radical polymerization reaction conditions, said monomer bearing substantially no functionality which is substantially reactive with hydroxy functionality of said macromonomer under said reaction conditions, which macromonomer is the reaction product of (i) isocyanato monomer having the formula:

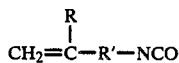

wherein R is hydrogen or $C_1$ to about $C_7$ alkyl, and R' is a divalent linking moiety which does not substantially interfere with the reactivity of either the isocyanate or the ethylenic double bond of said isocyanato monomer, with (ii) hydroxy functional polysiloxane reactant having about 0–10 urethane groups per molecule; and (B) polyfunctional, hydroxy-reactive crosslinking agent selected from aminoplast crosslinking agent, polyisocyanate crosslinking agent, blocked polyisocyanate crosslinking agent comprising at least two isocyanate groups blocked by reaction with active hydrogen bearing blocking agent, or a mixture thereof said crosslinking agent being included in an amount sufficient to provide, at a cure temperature of said composition, between about 0.5 and about 1.6 hydroxy reactive groups per hydroxy group contributed by said hydroxy functional polysiloxane graft copolymer.

26. A solvent based, one component, high solids enamel topcoat, adapted for application as a flexible coating on metal and plastic substrates, comprising:

(A) hydroxy functional polysiloxane graft copolymer of number average molecular weight about 1,500–3,000, having a hydroxy number between about 50 and about 150 and about 1–7 urethane linkages per molecule, and being the reaction product of carbon-carbon double bond-reactive monoethylenically unsaturated monomer with carbon-carbon double bond-bearing branched polysiloxane macromonomer under free radical polymerization reaction conditions, said monomer bearing substantially no functionality which is substantially reactive with hydroxy functionality of said macromonomer under said reaction conditions, said macromonomer being the reaction product of isocyanato ethyl methacrylate with hydroxy functional oligomeric polysiloxane reactant; and (B) alkylated melamine crosslinking agent, said crosslinking agent being included in an amount sufficient to provide between about 0.5 and about 1.6 hydroxy reactive group per hydroxy group of said polysiloxane graft copolymer.

* * * * *